(12) United States Patent
Karman et al.

(10) Patent No.: US 12,695,473 B2
(45) Date of Patent: Jul. 28, 2026

(54) RADIO TRANSMITTER

(71) Applicant: Cypress Semiconductor Corporation, San Jose, CA (US)

(72) Inventors: Saleh Karman, Villach (AT); Davide Manente, Mira (IT); Ibrahim Petricli, Pavia (IT); Davide Ponton, Villach (AT)

(73) Assignee: Infineon Technologies Americas Corp., El Segundo, CA (US)

( * ) Notice: Subject to any disclaimer, the term of this patent is extended or adjusted under 35 U.S.C. 154(b) by 302 days.

(21) Appl. No.: 18/478,816

(22) Filed: Sep. 29, 2023

(65) Prior Publication Data

US 2025/0112654 A1 Apr. 3, 2025

(51) Int. Cl.
H04B 1/04 (2006.01)

(52) U.S. Cl.
CPC ... H04B 1/0483 (2013.01); *H04B 2001/0408* (2013.01)

(58) Field of Classification Search
CPC .......... H04B 1/02; H04B 1/04; H04B 1/0483; H04B 1/38; H04B 1/40; H04B 1/44; H04B 2001/0408; H04B 2001/045; H03F 3/189; H03F 3/20; H03F 3/21; H03F 3/211; H03F 2203/211; H03F 2203/21106; H03F 2203/21142
See application file for complete search history.

(56) References Cited

U.S. PATENT DOCUMENTS

| | | | | |
|---|---|---|---|---|
| 7,834,686 B2 * | 11/2010 | Staszewski | ............. | H03F 3/211 |
| | | | | 330/195 |
| 8,488,497 B2 * | 7/2013 | Matsuura | ............. | H04B 1/0483 |
| | | | | 370/278 |
| 10,084,413 B2 * | 9/2018 | Su | ........................... | H03F 3/189 |
| 2009/0203327 A1 * | 8/2009 | Rofougaran | ............. | H04B 1/38 |
| | | | | 455/73 |

* cited by examiner

*Primary Examiner* — Quochien B Vuong

(57) ABSTRACT

A transmitter has an antenna port, a delay unit configured to receive and delay a transmit signal by a first phase amount to generate a first transmit signal component and delay the transmit signal a second phase amount to generate a second transmit signal component, a first power amplifier configured to amplify the first transmit signal component to generate a first amplified signal component, a second power amplifier configured to amplify the second transmit signal component to generate a second amplified signal component, a combiner configured to combine the first amplified signal component and the second amplified signal component to generate an output transmit signal at the antenna port, and a control unit configured to control the first phase amount and the second phase amount during a ramp interval to provide a phase difference between the first transmit signal component and the second transmit signal component.

20 Claims, 5 Drawing Sheets

100

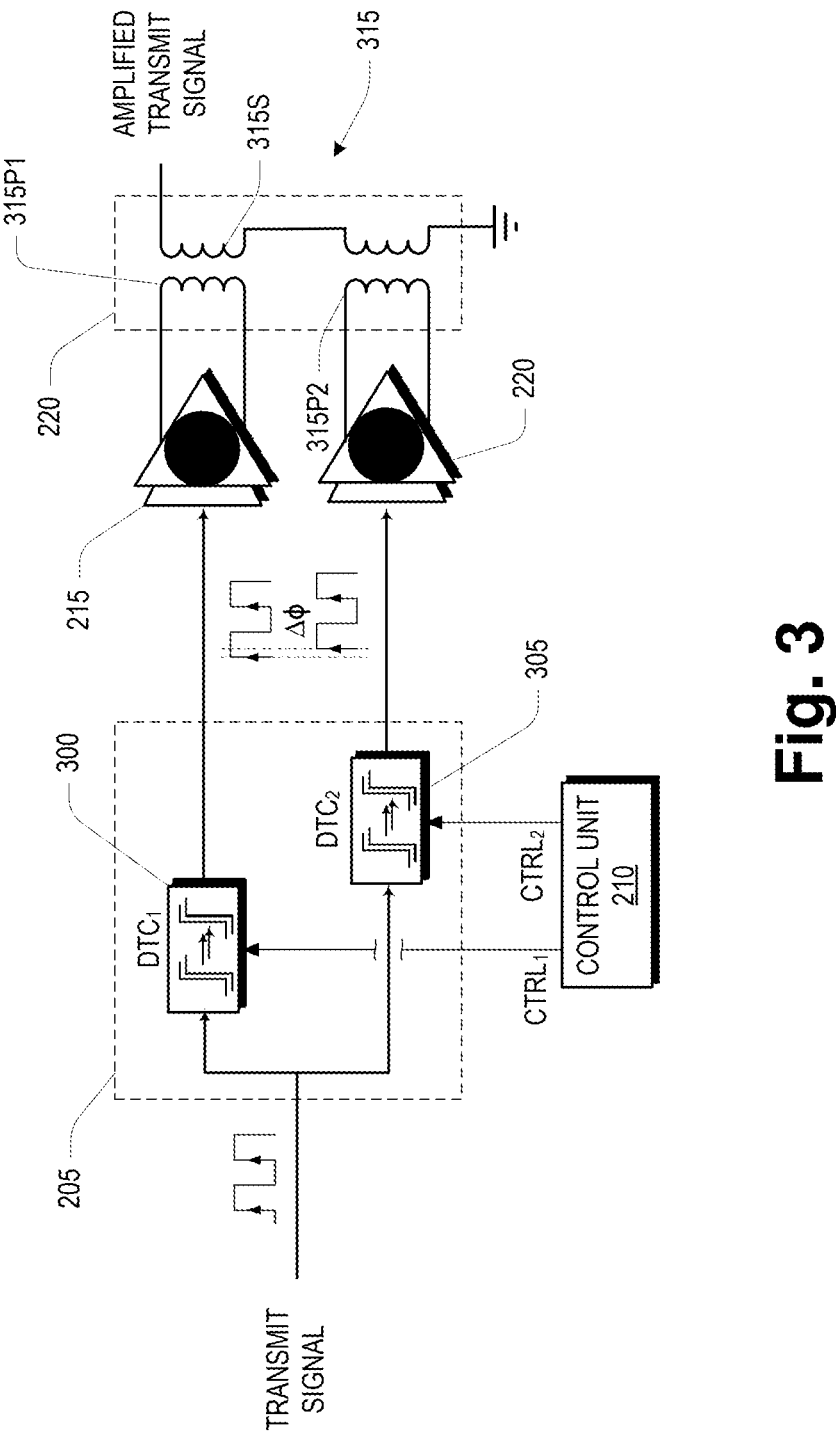
Fig. 3

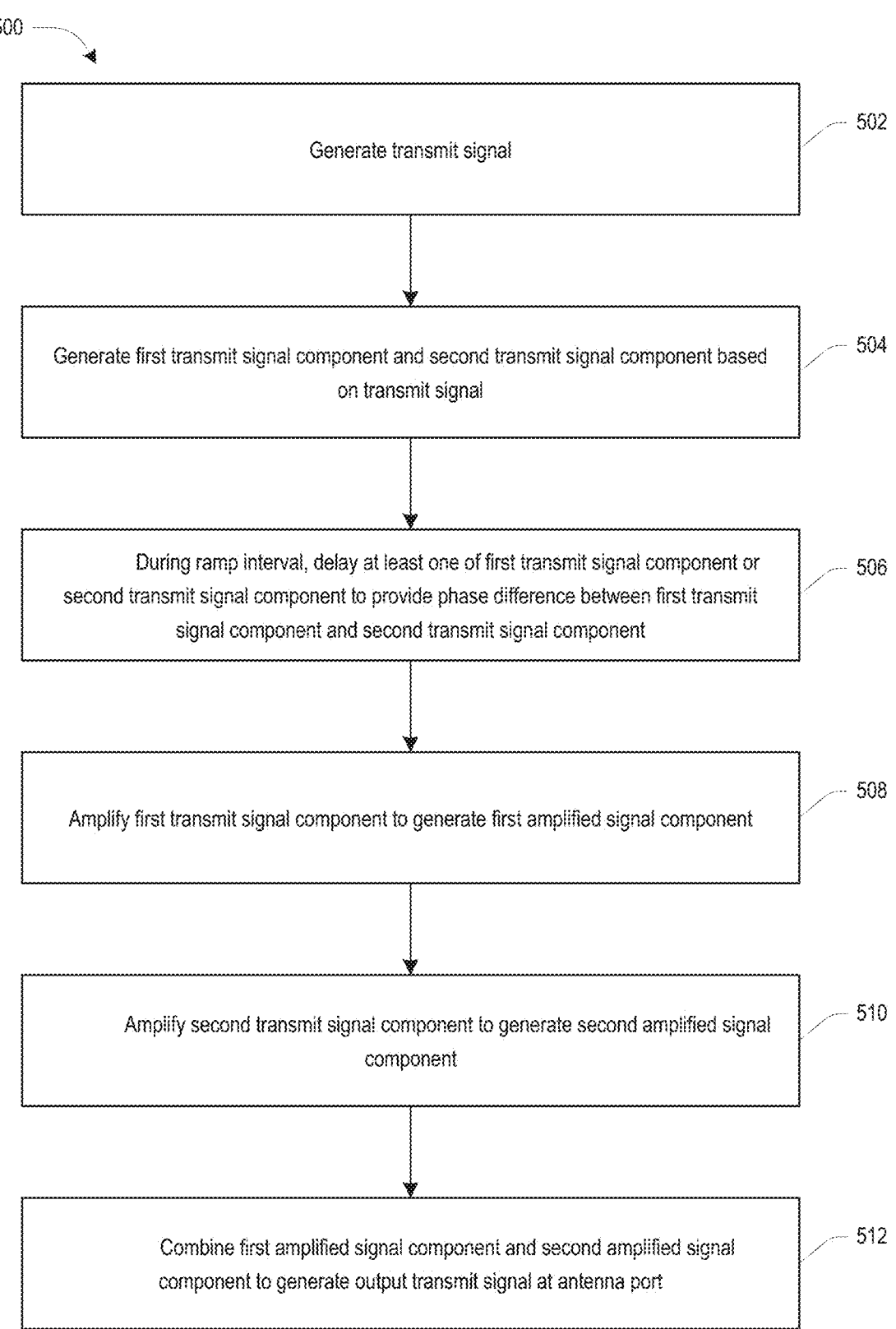

500

502 — Generate transmit signal

504 — Generate first transmit signal component and second transmit signal component based on transmit signal 506 — During ramp interval, delay at least one of first transmit signal component or second transmit signal component to provide phase difference between first transmit signal component and second transmit signal component 508 — Amplify first transmit signal component to generate first amplified signal component 510 — Amplify second transmit signal component to generate second amplified signal component 512 — Combine first amplified signal component and second amplified signal component to generate output transmit signal at antenna port

NON-TRANSITORY MEMORY DEVICE

604

001101 0110001 011000 0111111 0111111 0000000
00000 0111011 011110 011001 0111011 0000000

READING

608

DEVICE

606

PROCESSOR-
EXECUTABLE
INSTRUCTIONS

610

READER

612

PROCESSOR

614

RADIO TRANSMITTER

TECHNICAL FIELD

The present disclosure relates to the field of communications, and more particularly to a transmitter for a radio.

BACKGROUND

Power amplifiers generate transmission signals for radios. To conserve power radios are often powered down. Injection locked power amplifiers exhibit oscillator-like behavior during a start-up period and a shut-down period. For example, during start-up the oscillation of the power amplifier increases uncontrolled until the power amplifier saturates at the supply voltage.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment, a transmitter comprises an antenna port, a delay unit configured to receive and delay a transmit signal by a first phase amount to generate a first transmit signal component and delay the transmit signal by a second phase amount to generate a second transmit signal component, a first power amplifier configured to amplify the first transmit signal component to generate a first amplified signal component, a second power amplifier configured to amplify the second transmit signal component to generate a second amplified signal component, a combiner configured to combine the first amplified signal component and the second amplified signal component to generate an output transmit signal at the antenna port, and a control unit configured to control the first phase amount and the second phase amount during a ramp interval to provide a phase difference between the first transmit signal component and the second transmit signal component.

In an embodiment, a radio comprises an antenna port, a modem configured to generate a transmit signal, a transmit-receive switch connected to the antenna port, a receiver connected to the transmit-receive switch, and a transmitter connected to the transmit-receive switch and comprising a delay unit configured to generate a first transmit signal component based on the transmit signal and a second transmit signal component based on the transmit signal, a first power amplifier configured to amplify the first transmit signal component to generate a first amplified signal component, a second power amplifier configured to amplify the second transmit signal component to generate a second amplified signal component, and a combiner configured to combine the first amplified signal component and the second amplified signal component to generate an output transmit signal at the antenna port, and a processor configured to control the transmit-receive switch to toggle between a transmit mode, wherein the transmitter is connected to the antenna port, and a receive mode, wherein the receiver is connected to the antenna port, and, during a ramp interval of the transmit mode, configure the delay unit to delay at least one of the first transmit signal component or the second transmit signal component to provide a phase difference between the first transmit signal component and the second transmit signal component.

In an embodiment, a method comprises generating a transmit signal, generating a first transmit signal component and a second transmit signal component based on the transmit signal, during a ramp interval, delaying at least one of the first transmit signal component or the second transmit signal component to provide a phase difference between the first transmit signal component and the second transmit signal component, amplifying the first transmit signal component to generate a first amplified signal component, amplifying the second transmit signal component to generate a second amplified signal component, and combining the first amplified signal component and the second amplified signal component to generate an output transmit signal at an antenna port.

In an embodiment, an apparatus comprises means for generating a transmit signal, means for generating a first transmit signal component and a second transmit signal component based on the transmit signal, means for during a ramp interval, delaying at least one of the first transmit signal component or the second transmit signal component to provide a phase difference between the first transmit signal component and the second transmit signal component, means for amplifying the first transmit signal component to generate a first amplified signal component, means for amplifying the second transmit signal component to generate a second amplified signal component, and means for combining the first amplified signal component and the second amplified signal component to generate an output transmit signal at an antenna port.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 3 is a component block diagram illustrating a transmitter, according to some embodiments.

FIG. 5 is an illustration of an example method for controlled power ramping in a transmitter, according to some embodiments.

DETAILED DESCRIPTION

Figures 1, 2:
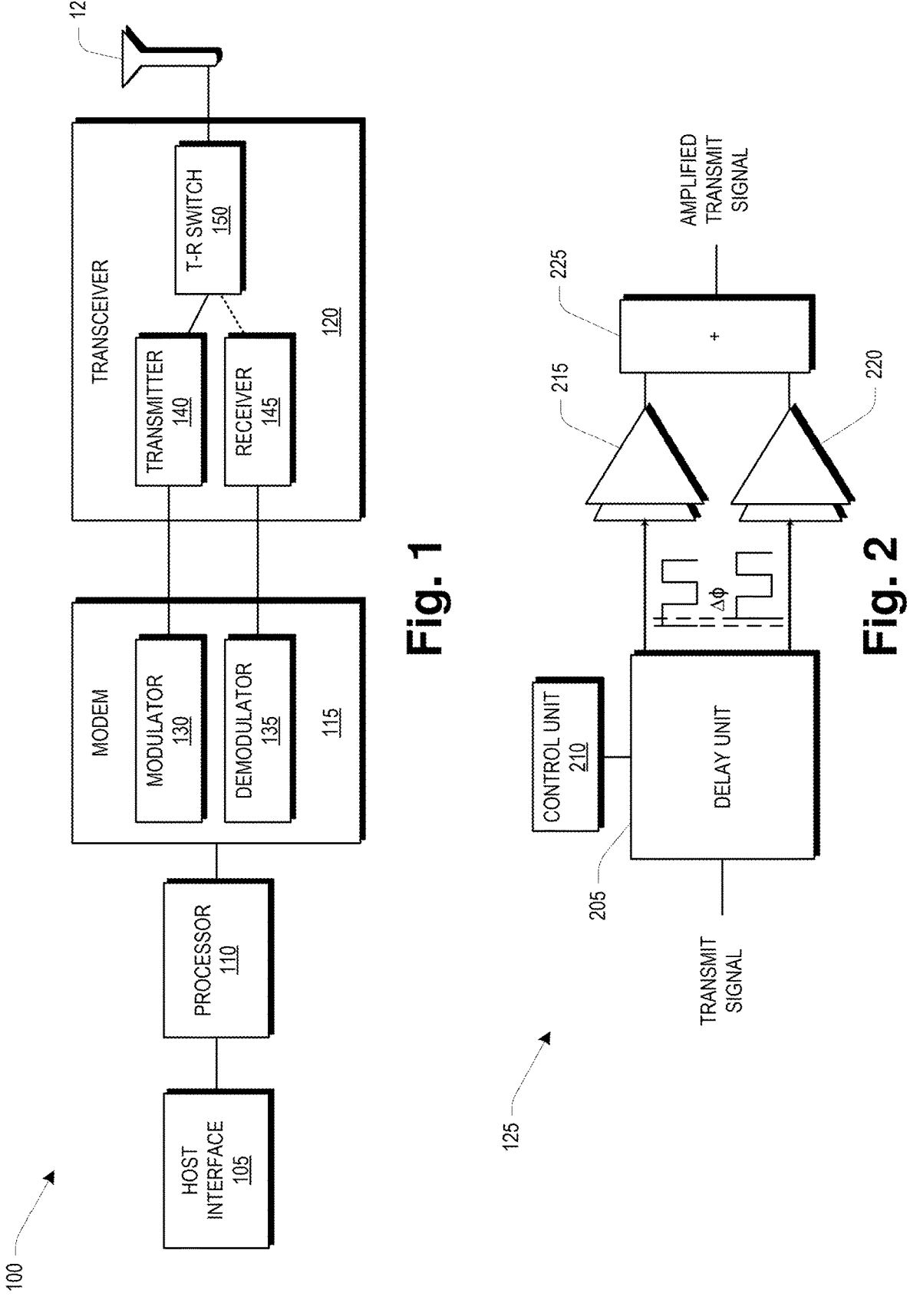
FIG. 1 is a component block diagram of a radio, according to some embodiments.
FIG. 2 is a component block diagram illustrating a transmitter, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

In some embodiments, a transmitter comprises a first power amplifier and a second power amplifier for generating a transmit signal. A first output signal from the first power amplifier is combined with a second output signal from the second power amplifier. A phase delay between the first output signal and the second output signal is controlled during a power ramp interval to control a ramp rate of the combined output signal.

FIG. 1 is a simplified block diagram of a radio 100, according to some embodiments. The radio 100 may support one or more communication protocols, such as a Bluetooth (BT), Bluetooth Low Energy (BLE), Wi-Fi, or some other communication protocol . . . is the radio comprises a host interface 105, a processor 110, a modem 115, a transceiver 120, and an antenna 125. The radio 100 may communicate with other devices, such as a host computer, using the host interface 105. The modem 115 comprises a modulator 130 and a demodulator 135. The transceiver 120 comprises includes a transmitter 140, a receiver 145, and a transmit-receive (T-R) switch 150. The T-R switch 150 is connected to the antenna 125 at an antenna port 155. The transmitter 140 is configured to transmit signals provided by the modulator 130 and the receiver 145 receives modulated signals and provide the modulated signals to demodulator 135 in the modem 115 for processing. Additionally, the radio 100 may further include a number of band pass filters, amplifiers, multiplexers, demultiplexers, converters, error correction units, analog-to-digital converters (ADCs), digital-to-analog converters (DACs), or other circuits within and through which signals are passed between the antenna 125 and components of the communication system.

The processor 110 implements a software or firmware application that controls communication by the radio 100. The processor 110 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 110 may be implemented as hardware (e.g., a microprocessor, etc.) or a combination of hardware and software (e.g., a SoC, an ASIC, etc.) and may include one or multiple memories (e.g., cache, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory).

In one embodiment, components of the host interface 105, the processor 110, the modem 115, and the transceiver 120 are integrally formed or incorporated on a single integrated circuit (IC) chip. The antenna 125 can also be integrally formed on the same IC chip, or on a separate chip on substrate packaged in a single multi-chip IC package with the IC chip including the host interface 105, the processor 110, the modem 115, and the transceiver 120. Alternatively, the antenna 125, as well as other components of the radio 100 can be separately implemented on a printed circuit board (PCB) to which the IC chip including the host interface 105, the processor 110, the modem 115, and the transceiver 120 are mounted or attached.

The processor 110 controls the T-R switch 150 to toggle between transmit and receive modes such that the transmitter 140 is connected to the antenna 125 during a transmit mode and the receiver 145 is connected to the antenna 125 during a receive mode. The radio 100 may include fewer components, additional components, different components, and/or a different arrangement of components than those illustrated in FIG. 1.

FIG. 2 is a component block diagram illustrating the transmitter 140, according to some embodiments. In some embodiments, the transmitter 140 comprises a delay unit 205, a control unit 210, power amplifiers 215, 220, and a combiner 225. The modulator 130 generates a transmit signal, such as a radio signal encoded with data. For example, the processor 110 may generate or receive data to be transmitted by the radio 100. The processor 110 may provide data to the modem 115, which processes the data in the modulator 130 to generate a transmit signal according to the communication protocol being implemented by the radio 100 to be transmitted using the antenna 125.

The delay unit 205 generates a first transmit signal component and a second transmit signal component based on the transmit signal. The transmitter 140 is subjected to ramp intervals when the transmitter 140 is powered up or powered down, for example, when mode of the transceiver 120 is changed between transmit and receive modes, or when the radio 100 powers down or wakes up from a sleep mode. A ramp interval is present during a power up event or a power down event. During a ramp interval, the delay unit 205 generates a phase difference, $\Delta\phi$, between the first transmit signal component and a second transmit signal component. The phase difference creates negative interference between the first transmit signal component and the second transmit signal component causing signal cancellation.

The control unit 210 controls the phase difference during the ramp interval. For example, during a startup ramp interval, the phase difference varies from 180° (i.e., full cancellation) at a first endpoint of the ramp interval (i.e., the starting endpoint) to 0° (i.e., no cancellation) at a second endpoint of the ramp interval (i.e., the termination endpoint). Conversely, during a shutdown ramp interval, the phase difference varies from 0° (i.e., no cancellation) at a first endpoint of the ramp interval (i.e., the starting endpoint) to 180° (i.e., full cancellation) at a second endpoint of the ramp interval (i.e., the termination endpoint). During normal transmission intervals, the phase difference is 0° (i.e., no cancellation). In some embodiments, the control unit 210 is implemented by the processor 110. Additional logic external to a CPU die of the processor 110 may be present, but such additional logic is considered part of the processor 110.

The power amplifiers 215, 220 amplify the first transmit signal component and the second transmit signal component to generate a first amplified signal component and a second amplified signal component, respectively. In some embodiments, the power amplifiers 215, 220 are injection-locked power amplifiers. The combiner 225 combines the first amplified signal component and the second amplified signal component to generate an output signal for transmission on the antenna 125.

FIG. 3 is a component block diagram of the transmitter 140, according to some embodiments. FIG. 3 illustrates example hardware for the delay unit 205 and the combiner 225. In some embodiments, the delay unit 205 comprises a first digital-to-time converter (DTC) 300 and a second DTC 305 that are each connected to receive the transmit signal. The DTCs 300, 305 receive a digital code, $CTRL_1$, $CTRL_2$, from the control unit 210 and implement a delay corresponding to the digital code to provide the phase difference between the first transmit signal component and the second transmit signal component. The time period corresponding to the phase delay depends on the frequency of the transmit signal, which may vary during the operation of the transmitter 140. In some embodiments, the control unit 210 employs a lookup table to generate the digital codes as a function of the transmit frequency. In some embodiments, the control unit 210 provides a digital code corresponding to no delay to one of the DTCs 300, 305 for the entirety of the ramp interval and varies the digital code provided to the other of the DTCs 300, 305 to change the phase difference from 0° to 180° or from 180° to 0° over the ramp interval. Although, in this example, the configuration of one of the DTCs 300, 305 does not change, the DTC 300, 305 provides transmission path parallelism for generating the first transmit signal component and the second transmit signal component. Other structures and/or configurations of the delay unit 205 are within the scope of the present disclosure.

In some embodiments, the combiner 225 comprises a transformer 315 comprising a first primary winding 315P1 connected to the power amplifier 215, a second primary winding 315P2 connected to the power amplifier 220, and a secondary winding interleaved with the primary windings 315P1, 315P2. The first amplified signal component is provided on the first primary winding 315P1 and the second amplified signal component is provided on the second primary winding 315P2. The signals on the primary windings 315P1, 315P2 are inductively communicated to the secondary winding 315S. The secondary winding generates the output signal of the combiner 225, which is a sum of the first amplified signal component and the second amplified signal component. Other structures and/or configurations of the combiner 225 are within the scope of the present disclosure.

Figure 4:
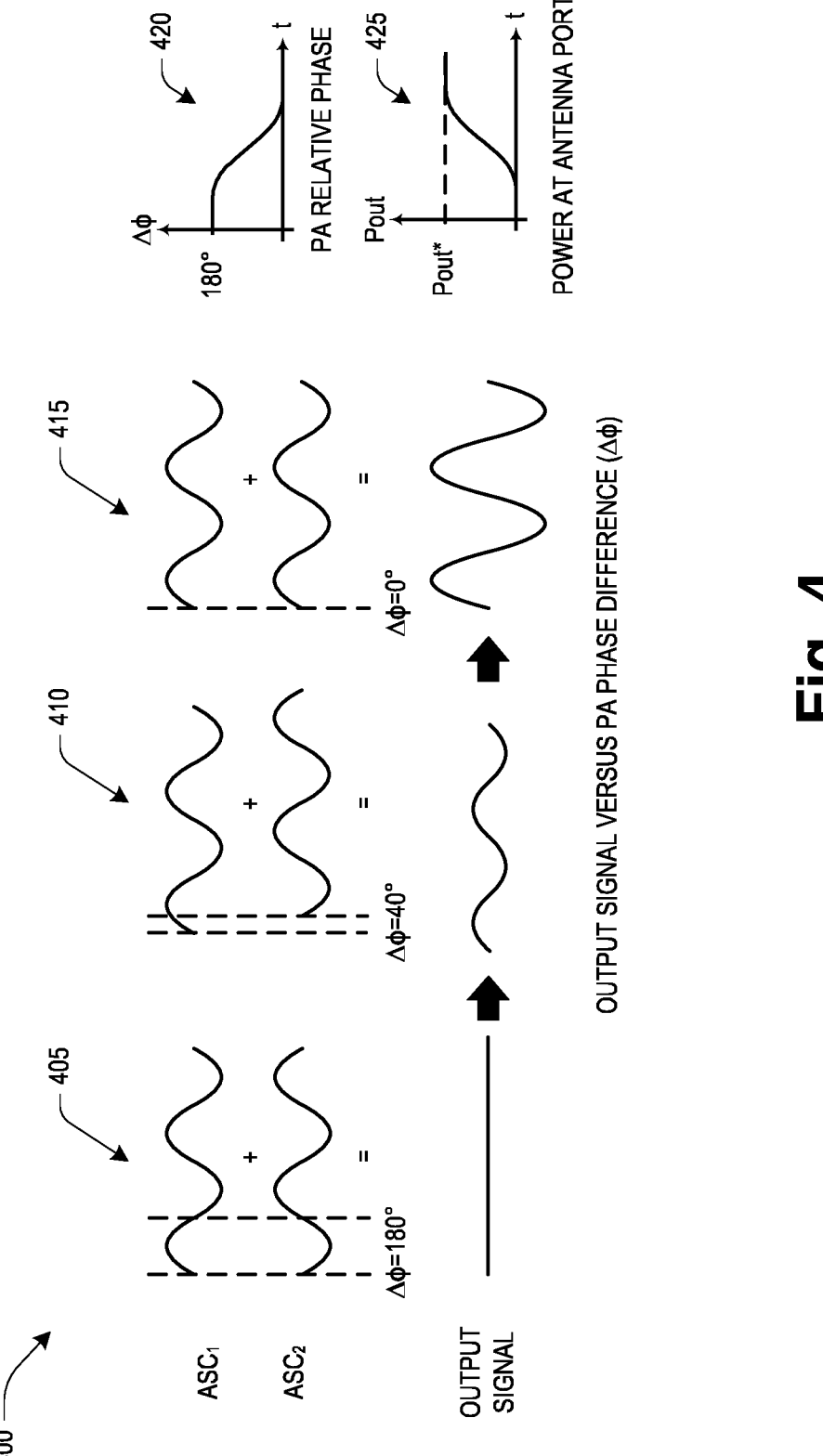
FIG. 4 is a diagram illustrating controlled power ramping in a transmitter, according to some embodiments.

FIG. 4 is a diagram 400 illustrating controlled power ramping in a transmitter 140, according to some embodiments. The diagram 400 comprises plots 405, 410, 415 illustrating the first amplified signal component, $ASC_1$, the second amplified signal component, $ASC_2$, and the output signal for phase differences of $\Delta\phi=180°$, $\Delta\phi=40°$, and $\Delta\phi=0°$, respectively. The plot 420 illustrates the phase difference between $ASC_1$ and $ASC_2$ over the ramp interval. The plot 425 illustrates the power generated by the transmitter 140 at the antenna port 155. FIG. 4 illustrates a ramp up interval. A ramp down interval may be implemented by reversing the phase difference to transition from 0° to 180°. With a phase differences of $\Delta\phi=180°$, $ASC_1$ and $ASC_2$ effectively cancel each other. The output power increases as the phase difference decreases until the output signal is at full power with a phase differences of $\Delta\phi=0°$. The ramp rate of the output signal, illustrated in the plot 425, is determined by the time interval over which the phase difference is varied from 180° to 0°. Hence, the ramp rate can be controlled as desired level over the ramp interval. In some embodiments, the ramp rate for a ramp up interval may be different than the ramp rate for a ramp down interval.

FIG. 5 is an illustration of an example method 500 for controlled power ramping in a transmitter, according to some embodiments. At 502, a transmit signal is generated. At 504, a first transmit signal component and a second transmit signal component are generated based on the transmit signal. At 506, during a ramp interval, such as a ramp up interval or a ramp down interval, at least one of the first transmit signal component or the second transmit signal component is delayed to provide a phase difference between the first transmit signal component and the second transmit signal component. At 508, the first transmit signal component is amplified to generate a first amplified signal component. At 510, the second transmit signal component is amplified to generate a second amplified signal component. At 512, the first amplified signal component and the second amplified signal component are combined to generate an output transmit signal at an antenna port.

Figure 6:
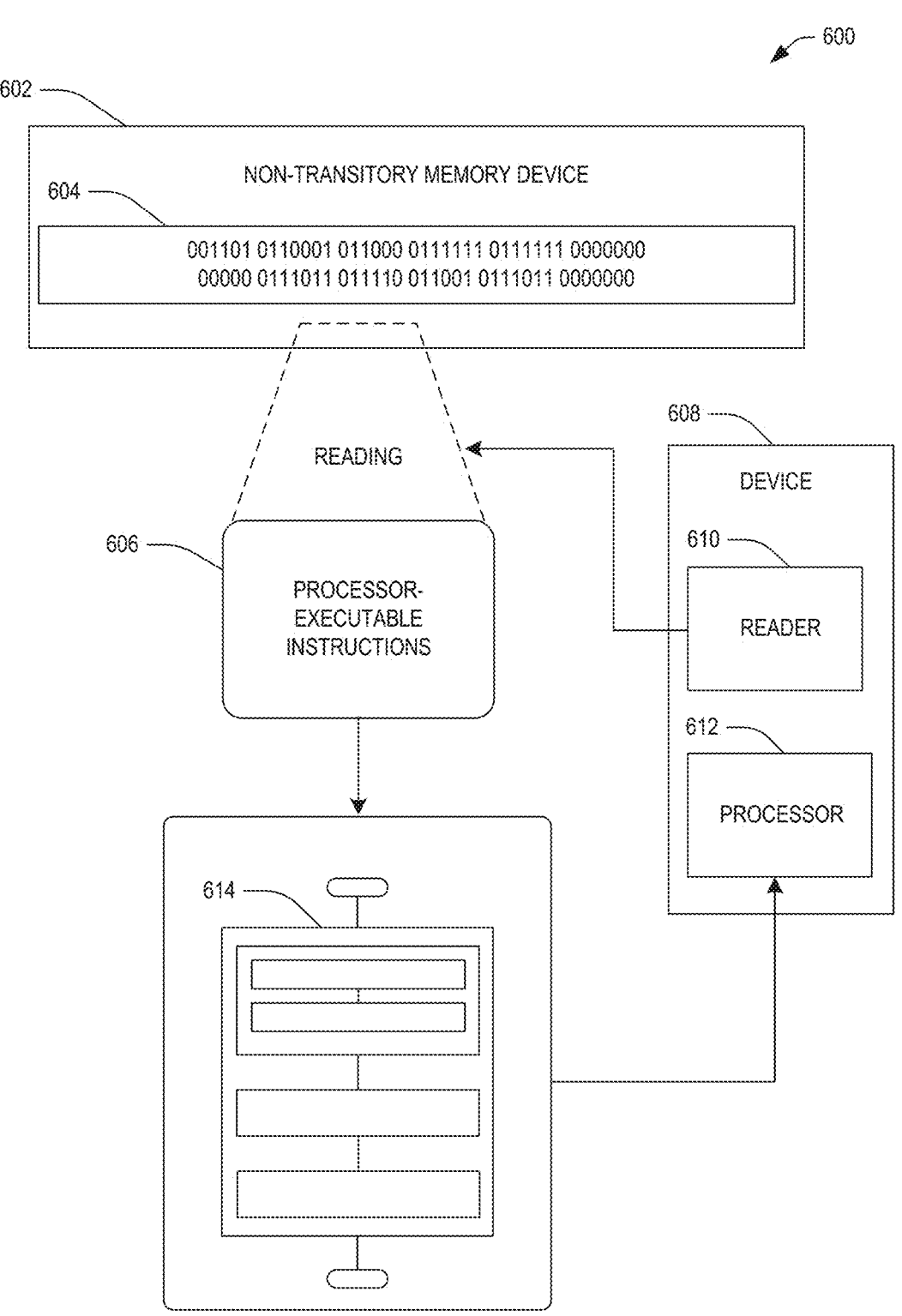
FIG. 6 illustrates an exemplary computer-readable medium, according to some embodiments.

FIG. 6 illustrates an exemplary embodiment 600 of a computer-readable medium 602, according to some embodiments. One or more embodiments involve a computer-readable medium comprising processor-executable instructions configured to implement one or more of the techniques presented herein. The embodiment 600 comprises a non-transitory computer-readable medium 602 (e.g., a CD-R, DVD-R, flash drive, a platter of a hard disk drive, etc.), on which is encoded computer-readable data 604. This computer-readable data 604 in turn comprises a set of processor-executable computer instructions 606 that, when executed by a computing device 608 including a reader 610 for reading the processor-executable computer instructions 606 and a processor 612 for executing the processor-executable computer instructions 606, are configured to facilitate operations according to one or more of the principles set forth herein. In some embodiments, the processor-executable computer instructions 606, when executed, are configured to facilitate performance of a method 614, such as at least some of the aforementioned method(s). In some embodiments, the processor-executable computer instructions 606, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment, a transmitter comprises an antenna port, a delay unit configured to receive and delay a transmit signal by a first phase amount to generate a first transmit signal component and delay the transmit signal by a second phase amount to generate a second transmit signal component, a first power amplifier configured to amplify the first transmit signal component to generate a first amplified signal component, a second power amplifier configured to amplify the second transmit signal component to generate a second amplified signal component, a combiner configured to combine the first amplified signal component and the second amplified signal component to generate an output transmit signal at the antenna port, and a control unit configured to control the first phase amount and the second phase amount during a ramp interval to provide a phase difference between the first transmit signal component and the second transmit signal component.

In an embodiment, the phase difference is 180° at a first endpoint of the ramp interval, and the phase difference is 0° at a second endpoint of the ramp interval.

In an embodiment, the ramp interval corresponds to a ramp up period, the first endpoint comprises a start point, and the second endpoint comprises a termination point.

In an embodiment, the ramp interval corresponds to a ramp down period, the first endpoint comprises a start point, and the second endpoint comprises a termination point.

In an embodiment, one of the first phase amount or the second phase amount is zero for an entirety of the ramp interval.

In an embodiment, at least one of the first power amplifier or the second power amplifier comprises an injection locked power amplifier.

In an embodiment, the delay unit comprises a first digital-to-time converter configured to receive the transmit signal and generate the first transmit signal component based on a first digital code and a second digital-to-time converter configured to receive the transmit signal and generate the second transmit signal component based on a second digital code and the control unit is configured to vary at least one of the first digital code or the second digital code over the ramp interval.

In an embodiment, the combiner comprises a transformer comprising a first primary winding coupled to receive the first amplified signal component, a second primary winding coupled to receive the second amplified signal component, and a secondary winding interleaved with the first primary winding and the second primary winding to generate the output transmit signal.

In an embodiment, a radio comprises an antenna port, a modem configured to generate a transmit signal, a transmit-receive switch connected to the antenna port, a receiver connected to the transmit-receive switch, and a transmitter connected to the transmit-receive switch and comprising a delay unit configured to generate a first transmit signal component based on the transmit signal and a second transmit signal component based on the transmit signal, a first power amplifier configured to amplify the first transmit signal component to generate a first amplified signal component, a second power amplifier configured to amplify the second transmit signal component to generate a second amplified signal component, and a combiner configured to combine the first amplified signal component and the second amplified signal component to generate an output transmit signal at the antenna port, and a processor configured to control the transmit-receive switch to toggle between a transmit mode, wherein the transmitter is connected to the antenna port, and a receive mode, wherein the receiver is connected to the antenna port, and, during a ramp interval of the transmit mode, configure the delay unit to delay at least one of the first transmit signal component or the second transmit signal component to provide a phase difference between the first transmit signal component and the second transmit signal component.

In an embodiment, the phase difference is 180° at a first endpoint of the ramp interval, and the phase difference is 0° at a second endpoint of the ramp interval.

In an embodiment, one of the first transmit signal component or the second transmit signal component is in phase with the transmit signal for an entirety of the ramp interval.

In an embodiment, at least one of the first power amplifier or the second power amplifier comprises an injection locked power amplifier.

In an embodiment, the delay unit comprises a first digital-to-time converter configured to receive the transmit signal and generate the first transmit signal component based on a first digital code, and a second digital-to-time converter configured to receive the transmit signal and generate the second transmit signal component based on a second digital code, and the processor is configured to vary at least one of the first digital code or the second digital code over the ramp interval.

In an embodiment, the combiner comprises a transformer comprising a first primary winding coupled to receive the first amplified signal component, a second primary winding coupled to receive the second amplified signal component, and a secondary winding interleaved with the first primary winding and the second primary winding to generate the output transmit signal.

In an embodiment, a method comprises generating a transmit signal, generating a first transmit signal component and a second transmit signal component based on the transmit signal, during a ramp interval, delaying at least one of the first transmit signal component or the second transmit signal component to provide a phase difference between the first transmit signal component and the second transmit signal component, amplifying the first transmit signal component to generate a first amplified signal component, amplifying the second transmit signal component to generate a second amplified signal component, and combining the first amplified signal component and the second amplified signal component to generate an output transmit signal at an antenna port.

In an embodiment, the method comprises controlling the phase difference to vary the phase difference from 180° at a first endpoint of the ramp interval to 0° at a second endpoint of the ramp interval.

In an embodiment, the ramp interval corresponds to a ramp up period, and controlling the phase difference comprises controlling the phase difference to vary the phase difference from 180° at a start point of the ramp interval to 0° at a termination point of the ramp interval.

In an embodiment, the ramp interval corresponds to a ramp down period, and controlling the phase difference comprises controlling the phase difference to vary the phase difference from 0° at a start point of the ramp interval to 180° at a termination point of the ramp interval.

In an embodiment, the method comprises providing the transmit signal to a first digital-to-time converter to generate the first transmit signal component based on a first digital code, and providing the transmit signal to a second digital-to-time converter to generate the second transmit signal component based on a second digital code, wherein delaying at least one of the first transmit signal component or the second transmit signal component comprises varying at least one of the first digital code or the second digital code over the ramp interval.

In an embodiment, combining the first amplified signal component and the second amplified signal component comprises providing the first amplified signal component to a first primary winding of a transformer, providing the second amplified signal component to a second primary winding of the transformer, and generating the output transmit signal at an output of a secondary winding of the transformer interleaved with the first primary winding and the second primary winding.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A transmitter, comprising:
an antenna port;
a delay unit configured to receive and delay a transmit signal by a first phase amount to generate a first transmit signal component and delay the transmit signal by a second phase amount to generate a second transmit signal component;
a first power amplifier configured to amplify the first transmit signal component to generate a first amplified signal component;
a second power amplifier configured to amplify the second transmit signal component to generate a second amplified signal component;
a combiner configured to combine the first amplified signal component and the second amplified signal component to generate an output transmit signal at the antenna port; and
a control unit configured to control the first phase amount and the second phase amount during a ramp interval to provide a phase difference between the first transmit signal component and the second transmit signal component to control a ramp rate of the output transmit signal during the ramp interval.

2. The transmitter of claim 1, wherein:
the phase difference is 180° at a first endpoint of the ramp interval; and
the phase difference is 0° at a second endpoint of the ramp interval.

3. The transmitter of claim 2, wherein:

the ramp interval corresponds to a ramp up period;

the first endpoint comprises a start point; and the second endpoint comprises a termination point.

4. The transmitter of claim 2, wherein:

the ramp interval corresponds to a ramp down period;

the first endpoint comprises a start point; and the second endpoint comprises a termination point.

5. The transmitter of claim 1, wherein:

one of the first phase amount or the second phase amount is zero for an entirety of the ramp interval.

6. The transmitter of claim 1, wherein:

at least one of the first power amplifier or the second power amplifier comprises an injection locked power amplifier.

7. The transmitter of claim 1, wherein:

the delay unit comprises:

a first digital-to-time converter configured to receive the transmit signal and generate the first transmit signal component based on a first digital code; and a second digital-to-time converter configured to receive the transmit signal and generate the second transmit signal component based on a second digital code; and the control unit is configured to vary at least one of the first digital code or the second digital code over the ramp interval.

8. The transmitter of claim 1, wherein the combiner comprises:

a transformer comprising:

a first primary winding coupled to receive the first amplified signal component;

a second primary winding coupled to receive the second amplified signal component; and a secondary winding interleaved with the first primary winding and the second primary winding to generate the output transmit signal.

9. A radio, comprising:

a modem configured to generate a transmit signal;

an antenna port;

a transmit-receive switch connected to the antenna port;

a receiver connected to the transmit-receive switch; and a transmitter connected to the transmit-receive switch and comprising:

a delay unit configured to generate a first transmit signal component based on the transmit signal and a second transmit signal component based on the transmit signal;

a first power amplifier configured to amplify the first transmit signal component to generate a first amplified signal component;

a second power amplifier configured to amplify the second transmit signal component to generate a second amplified signal component; and a combiner configured to combine the first amplified signal component and the second amplified signal component to generate an output transmit signal at the antenna port; and a processor configured to control the transmit-receive switch to toggle between a transmit mode, wherein the transmitter is connected to the antenna port, and a receive mode, wherein the receiver is connected to the antenna port, and, during a ramp interval of the transmit mode, configure the delay unit to delay at least one of the first transmit signal component or the second transmit signal component to provide a phase difference between the first transmit signal component and the second transmit signal component.

10. The radio of claim 9, wherein:

the phase difference is 180° at a first endpoint of the ramp interval; and the phase difference is 0° at a second endpoint of the ramp interval.

11. The radio of claim 9, wherein:

one of the first transmit signal component or the second transmit signal component is in phase with the transmit signal for an entirety of the ramp interval.

12. The radio of claim 9, wherein:

at least one of the first power amplifier or the second power amplifier comprises an injection locked power amplifier.

13. The radio of claim 9, wherein:

the delay unit comprises:

a first digital-to-time converter configured to receive the transmit signal and generate the first transmit signal component based on a first digital code; and a second digital-to-time converter configured to receive the transmit signal and generate the second transmit signal component based on a second digital code; and the processor is configured to vary at least one of the first digital code or the second digital code over the ramp interval.

14. The radio of claim 9, wherein the combiner comprises:

a transformer comprising:

a first primary winding coupled to receive the first amplified signal component;

a second primary winding coupled to receive the second amplified signal component; and a secondary winding interleaved with the first primary winding and the second primary winding to generate the output transmit signal.

15. A method, comprising:

generating a transmit signal;

generating a first transmit signal component and a second transmit signal component based on the transmit signal;

during a ramp interval, delaying at least one of the first transmit signal component or the second transmit signal component to provide a phase difference between the first transmit signal component and the second transmit signal component;

amplifying the first transmit signal component to generate a first amplified signal component;

amplifying the second transmit signal component to generate a second amplified signal component;

combining the first amplified signal component and the second amplified signal component to generate an output transmit signal at an antenna port; and controlling the phase difference to control a ramp rate of the output transmit signal during the ramp interval.

16. The method of claim 15, wherein comprising:

controlling the phase difference comprises controlling the phase difference to vary the phase difference from 180° at a first endpoint of the ramp interval to 0° at a second endpoint of the ramp interval.

17. The method of claim 16, wherein:

the ramp interval corresponds to a ramp up period; and controlling the phase difference comprises controlling the phase difference to vary the phase difference from 180° at a start point of the ramp interval to 0° at a termination point of the ramp interval.

18. The method of claim 16, wherein:

the ramp interval corresponds to a ramp down period; and controlling the phase difference comprises controlling the phase difference to vary the phase difference from 0° at a start point of the ramp interval to 180° at a termination point of the ramp interval.

19. The method of claim 15, comprising:

providing the transmit signal to a first digital-to-time converter to generate the first transmit signal component based on a first digital code; and providing the transmit signal to a second digital-to-time converter to generate the second transmit signal component based on a second digital code, wherein:

delaying at least one of the first transmit signal component or the second transmit signal component comprises varying at least one of the first digital code or the second digital code over the ramp interval.

20. The method of claim 15, wherein combining the first amplified signal component and the second amplified signal component comprises:

providing the first amplified signal component to a first primary winding of a transformer;

providing the second amplified signal component to a second primary winding of the transformer; and generating the output transmit signal at an output of a secondary winding of the transformer interleaved with the first primary winding and the second primary winding.

* * * * *